April 28, 1970 P. DIAMANT 3,509,397
MULTISEGMENTED SQUIRREL CAGE ROTOR BARS SHAPED FOR IMPROVED
MOTOR OPERATING CHARACTERISTICS
Filed April 8, 1969 3 Sheets-Sheet 1

INVENTOR.
PAUL DIAMANT
BY

INVENTOR.
PAUL DIAMANT

United States Patent Office 3,509,397
Patented Apr. 28, 1970

3,509,397
MULTISEGMENTED SQUIRREL CAGE ROTOR
BARS SHAPED FOR IMPROVED MOTOR
OPERATING CHARACTERISTICS
Paul Diamant, Milwaukee, Wis., assignor to The Louis Allis Company, a corporation of Delaware
Filed Apr. 8, 1969, Ser. No. 814,268
Int. Cl. H02k 3/08
U.S. Cl. 310—212                    12 Claims

ABSTRACT OF THE DISCLOSURE

Motor operating characteristics are controlled by rotor bar shaping. A desired balance between low locked rotor current, high acceleration torque and low running losses is achieved with controlled segmenting or shaping of multisegmented rotor bars.

BACKGROUND OF THE INVENTION

This invention relates to shaped rotor bars for motors having squirrel cage rotor windings and more particularly relates to improving the operating characteristics of such motors by controlled segmenting or shaping of the rotor bars.

It has long been known that motor operating characteristics can be greatly influenced by the configuration of the rotor bar. Recipes of general application for achieving controlled motor characteristics have not been realized, however. This is due to the considerable complexity of the design mathematics and because many of the motor characteristics require contradicting rotor bar configurations. Thus, for example, when it is desired to improve motor acceleration torque and the width of the rotor bar is reduced to accomplish this, an increase of motor locked rotor current and running losses may be experienced depending upon the portion of the bar reduced in width. It is often impossible to control one motor characteristic without deleteriously affecting others.

It has been discovered as part of the realization of the present invention that reduced rotor bar width for selected portions of the bar can improve motor acceleration torque. It was also discovered that locked rotor current control could be achieved by increased rotor bar width at another portion of the rotor bar. In addition, to keep motor running losses down, the rotor bars should have sufficient cross section to reduce running resistance and thereby reduce heat generation. Thus, it can be seen that the design of the rotor bar must be a balancing of contradictory demands on the shape of the bar.

SUMMARY OF THE INVENTION

It is an object of the present invention to improve motor acceleration torque while controlling locked rotor current by rotor bar shaping.

Another object of the present invention is to improve motor acceleration torque while locked rotor current is kept low and motor running losses are suppressed by rotor bar shaping.

In general, these and other objects of the invention are realized by controlled shaping or segmenting of a rotor bar. Given a rotor bar, control of the characteristics of the motor is achieved by selection of the relative dimensions and position of consecutive segments thereof where each segment primarily relates in bar depth to a particular motor characteristic. The location of these segments along the depth of the bar is by reference to the depth of penetration with respect to resistance ($H_{pr}$) and with respect to inductance ($H_{px}$) that the rotor bar experiences at different motor speeds. $H_{pr}$ and $H_{px}$ are described below.

M. M. Liwschitz-Garik, in a paper entitled "Computation of Skin Effect in Bars of Squirrel-Cage Rotors" published in the August 1955 transactions of the AIEE at pages 768 to 771, identifies the depth of penetration with respect to resistance and the depth of penetration with respect to inductance in rotor bars. M. M. Liwschitz-Garik uses this depth of penetration nomenclature as a handy tool for computing the results of the skin effect on rotor bar characteristics. Because the rotor bar is enclosed in the steel of the rotor on all sides except at the top of the bar where the air gap between the rotor and the stator exists, the result of the skin effect on the bar is a crowding of the flux and current paths toward the top of the bar. Thus, the bar depth appears to be shortened because of the skin effect. The definition of the depth of penetration with respect to resistance and the depth of penetration with respect to inductance readily follows. $H_{pr}$ is a term indicating bar depth characterized by its resistance. $H_{pr}$ of 1.0 inch for a specific bar means that the rotor bar has a resistance due to the skin effect equal to that of the upper 1.0 inch deep portion of the same bar free of skin effect. The definition of $H_{px}$ corresponds. Because the skin effect decreases with increased motor speed, the effective depth of the bar, i.e., the depth of penetration with respect to resistance and the depth of penetration with respect to inductance, increases with speed.

The invention is concerned with the improvement of acceleration torque of the motor which is in a range of constantly changing speed and because $H_{pr}$ and $H_{px}$ constantly change with speed, this nomenclature is useful in identifying the position of the segments of the rotor bar where shaping can improve acceleration torque apart from locked rotor current and motor running loss control.

BRIEF DESCRIPTION OF THE DRAWINGS

The objects set forth and other inherent objects and advantages of the invention will be more readily understood from a detailed description of the invention with reference to the drawings, in which.

DETAILED DESCRIPTION OF THE DRAWINGS

Figure 1:
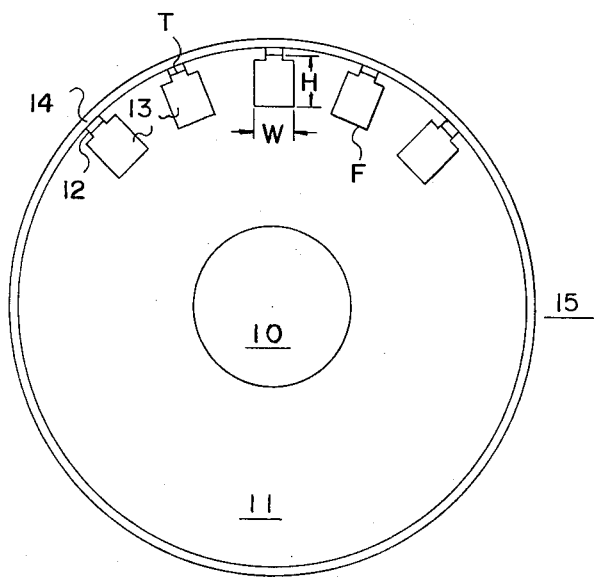
FIGURE 1 is a cross section of a motor showing the location of the rotor bars in the rotor.

Referring now to the drawings, FIGURE 1 is an end view of a typical single squirrel cage rotor induction motor of the prior art. FIGURE 1 shows the rotor 11 mounted on and turnable with shaft 10 and containing rotor bars 13 in slots 12. The rotor 11 is separated from the stator 15 by an air gap 14 to which each of the rotor bars is exposed at the tip or top T thereof or separated therefrom only by a thin steel bridge. It is to be understood that while only five rotor bars are shown that the rotor bars extend around the rotor to form a cage-like structure. Although not shown, the rotor bars are shorted together at the ends thereof to form completed loops thereby constituting the rotor windings. The letters T, F, W and H shown in FIGURE 1 indicate the top or tip of the rotor bar, the foot or base thereof, the width and the height or depth, respectively.

Figure 2:
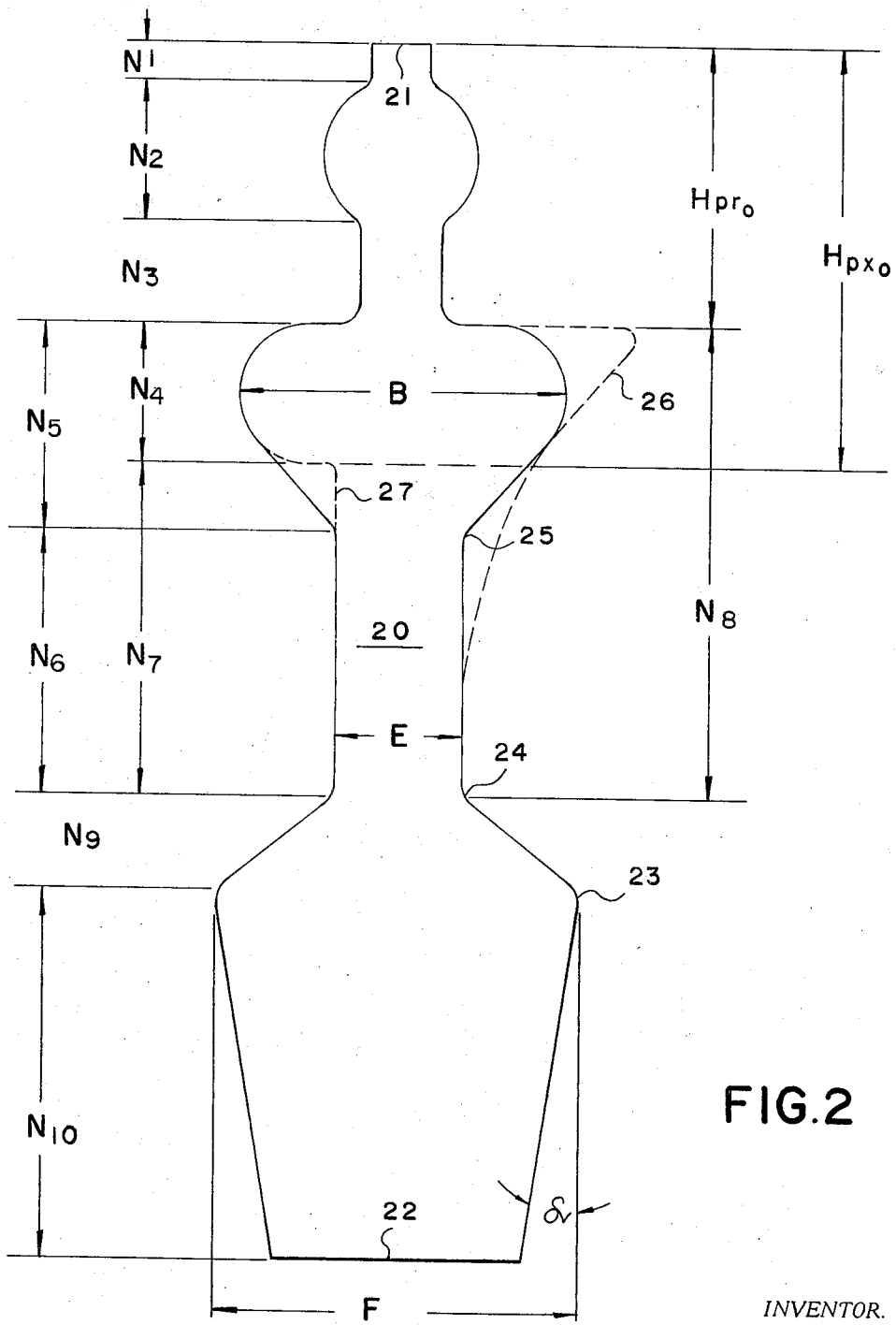
FIGURE 2 is an end view of a generalized multisegmented rotor bar.

FIGURE 2 shows a generalized multisegmented single cage rotor bar useful in illustrating rotor bar shaping in accordance with the present invention. Rotor bar 20 is shown in solid line with dashed line alternatives 26 and 27 and includes ten possible segments. Of these segments only $N_4$ through $N_{10}$ are of interest. These are the segments which appear below the depth of penetration with respect to resistance for zero speed ($H_{pr_0}$).

The portion of the bar between $H_{pr_0}$ and $H_{px_0}$ is of interest for its effect on locked rotor current. The width dimension B of this portion of the bar is shown to greatly exceed the width of the segment immediately below $H_{px_0}$. This wide dimension is for the purpose of limiting locked rotor current. It is noted that the portion of the rotor bar immediately below $H_{pr_0}$ can take on many different shapes. It can consist of the triangular segment $N_5$, the rectangular segment $N_4$ defined by dashed line 27 or the concave curved triangular segment $N_8$ indicated by dashed line 26.

One of the objects of the invention is to increase acceleration torque while maintaining low locked rotor current. Due to the skin effect it is possible to define the portion of the rotor bar corresponding to this range of operation. The corresponding portion of the rotor bar lies between $H_{px_0}$ and the base of the bar. It has been discovered that by narrowing the rotor bar in this region to increase bar resistance that the torque of the motor is improved. Several of the many possible configurations for accomplishing this are shown in the figure.

FIGURE 2 shows that reduction of rotor bar width to increase motor acceleration torque can be achieved by shaping or by segmenting. Dashed line 27 defines a segment $N_7$ of narrow rotor bar width. The solid line defines a segment $N_6$ of narrow width preceded by a segment $N_5$ which includes a wide portion between $H_{pr_0}$ and $H_{px_0}$ for low locked rotor current and a shaped portion of reducing width from approximately $H_{px_0}$ to the inflection point 25. Finally, dashed line 26 defines triangular segment $N_8$ of reducing width from $H_{pr_0}$ to inflection point 24.

In each of the examples of bar shaping the reduction in width is at a greater rate than a straight line taper from a point of tangency to the contour between $H_{pr_0}$ and $H_{px_0}$ and the base of the bar. The $H_{pr_0}$ to the base straight line taper configuration is known in the art for achieving equidistance between adjacent bars around the rotor. Such a configuration is not capable of achieving the objects of the invention and is only mentioned to distinguish the invention therefrom.

The concern to maintain low locked rotor current while increasing the acceleration torque as much as possible is achieved by narrowing the rotor bar below $H_{px_0}$ which increases acceleration torque while maintaining sufficient width above $H_{px_0}$ (and below $H_{pr_0}$) to limit locked rotor current. It is possible to achieve isolation between the results of bar dimensions above and below $H_{px_0}$ because any change in dimension below $H_{px_0}$ will not affect locked rotor conditions. This is because at zero speed there is no effective bar depth below $H_{px_0}$. It follows that it is desirable to have the B width extend throughout the $H_{pr_0}$–$H_{px_0}$ region and the E width extend throughout the region between $H_{px_0}$ and $H_{px}$ for the desired speed for torque improvement.

It is noted that so long as sufficient rotor bar width is provided between $H_{pr_0}$ and $H_{px_0}$ that the segment for improving motor torque between zero speed and breakdown torque speed can begin at $H_{pr_0}$. This is indicated by dashed line 26.

FIGURE 2 shows a wide segment $N_{10}$ radially in depth below the segment of narrow width E. This segment of increased width is preceded by a transitional segment $N_9$. For all practical purposes, therefore, the segment of increased width begins substantially at the end of the segment of reduced width E. The sides of segment $N_{10}$ can be tapered or vertical as indicated by the angle $\alpha$. This segment of increased width provides for low motor running losses.

It should be understood that the width of segments $N_9$ and $N_{10}$ can be equal to E where improving motor running losses is not practical.

Figure 3:
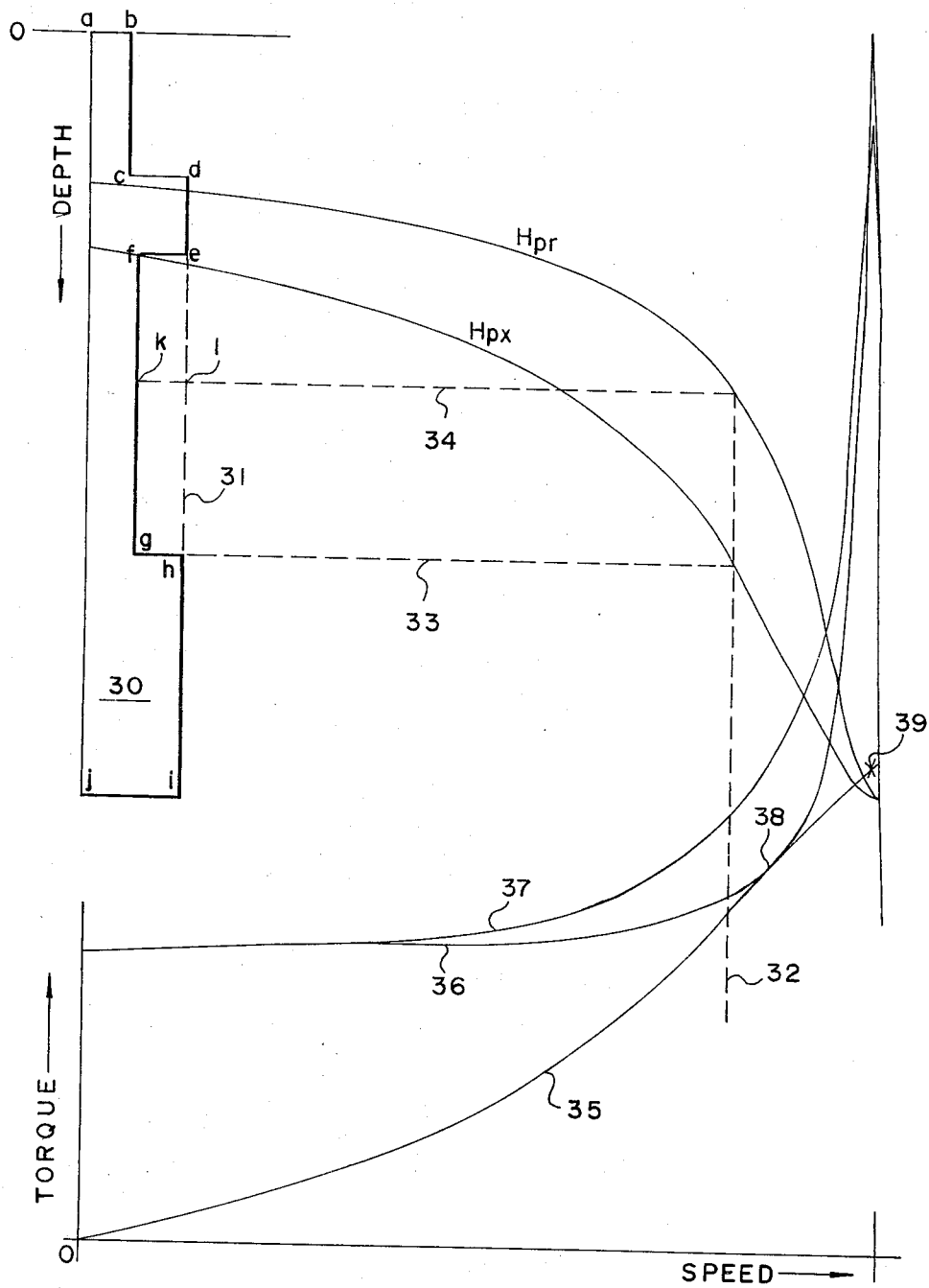
FIGURE 3 shows an end view of a symmetrical half of a rotor bar, the $H_{pr}$ and $H_{px}$ curves for the bar, and the torque-speed curves of the motor.

Once again, as will be more apparent from review of FIGURE 3, the segment for improving motor acceleration torque appears at a different portion of the rotor bar than those portions which affect locked rotor and running characteristics.

FIGURE 3 shows a symmetrical half of one of several preferred rotor bar shapes 30, the $H_{pr}$ and $H_{px}$ curves for the bar and the related motor torque-speed curves. The curves shown are equally applicable to the entire bar or the half bar illustrated. Rotor bar 30 is formed by the removal of the segment portion "efgh" from the normal prior art bar.

FIGURE 3 illustrates the relationship between the change in depth of penetration curves with speed and the positioning of the segment portion to be removed from the rotor bar in accordance with $H_{pr}$ and $H_{px}$ to realize improved torque at a desired speed. Curve 35 shows the torque of the load being driven by the motor. Curve 36 shows the torque curve of the motor having rotor bars with segment portion "efgh" in place. It is noted that the curve 36 touches the load torque curve 35 at a point 38 on the elbow of the torque curve. This touching of the curves means that the motor torque applied to the load is no greater than the load requires and therefore, the motor has no available torque to accelerate the motor to normal running speed which is indicated by the point 39.

FIGURE 3 shows that at zero speed the depth of penetration with respect to resistance ($H_{pr_0}$) substantially appears at the "cd" line, which in FIGURE 2 is the beginning of the $N_4$, $N_5$ and $N_8$ segments. The depth of penetration with respect to inductance at zero speed ($H_{px_0}$) is at the "fe" line. It is noted that the $H_{px}$ curve stays below the $H_{pr}$ curve throughout the speed range. Both the $H_{pr}$ and the $H_{px}$ curves increase in depth from zero with increased speed and as such proceed down along the depth of the bar 30 as the speed increases so that at running speed where the skin effect is substantially nonexistent, the entire bar becomes its effective depth with respect to resistance and with respect to inductance.

Since the normal torque curve 36 of the motor touches the load curve at point 38 which is at the center of the elbow torque region of the curve, it is desired to improve the elbow torque region of the torque-speed curve and therefore a point indicated by dashed line 32, marking the beginning of the elbow torque region, is selected to graphically demonstrate the position of the segment portion to be removed from the rotor bar. The vertical line 32 is projected upward across the $H_{px}$ and $H_{pr}$ lines. Dashed horizontal line 34 from the $H_{pr}$ curve to the rotor bar indicates the depth of penetration with respect to resistance for the rotor bar at the speed selected. If the segment portion "efkl" were removed from the rotor bar, an improvement in the motor torque based upon bar resistance alone would be realized. However, to achieve the benefit of torque improvement based upon bar inductance, dashed line 33 is relied upon to define the segment of the bar. The segment "efgh" thus defined includes correction based on resistance and inductance.

The invention has been discussed primarily with reference to examples of single squirrel cage rotor bars for use in induction motors. This is because motors of this type are more likely to have rotor bars of sufficient size to realize the change in depth of penetration with respect to resistance and depth of penetration with respect to inductance as motor speed changes, i.e., rotor bars of larger ones of these motors are susceptive to the skin effect throughout the acceleration speed range so that their design in accordance with the present invention is meaningful. However, the invention is not limited to induction motors or to induction motors having only a single squirrel cage. Synchronous motors often have auxiliary windings made up of bars where the application of the present invention would be beneficial. The invention is also applicable to double cage rotors where either bar of the set is of sufficient length to experience $H_{pr}$ and $H_{px}$ change through the torque acceleration range.

Depending upon the method of manufacture, the slots of the rotor may or may not conform to the shape of the rotor bars when they are shaped in accordance with the principles of the present invention. Whether or not the rotor slot for the bar follows the contour of the bar or has air space or other nonmagnetic material or even magnetic material separately inserted between the reduced width portion of the bar and the slot will provide no detrimental effect to the motor characteristics controlled by the bar configurations.

It is also to be noted that the segments of the multi-segmented bars can be tilted or shifted without adverse effect on the parameters of the motor being controlled by the segmenting. In addition, since temperature change affects the results of the skin effect the exact position of $H_{pr}$ and $H_{px}$ will also vary with temperature.

The foregoing description with its specific examples is intended to be only descriptive of the principles of the invention and not limiting beyond the scope of the appended claims.

What is claimed and and desired to be secured by Letters Patent of the United States is:

1. In an electric motor having a squirrel cage rotor winding with rotor bars of sufficient size for effective realization of the change of depth of penetration with respect to resistance ($H_{pr}$) and depth of penetration with respect to inductance ($H_{px}$) as a function of motor speed, the improvement comprising:
said rotor bars being shaped to increase motor acceleration torque while maintaining low locked rotor current,
wherein the width of each rotor bar below $H_{pr}$ for zero speed reduces at a greater rate than a straight line taper from tangency between $H_{pr}$ and $H_{px}$ for zero speed to the base of the bar.

2. The improvement recited in claim 1 wherein the portion of reduced width substantially begins at and extends below $H_{pr}$ for zero speed.

3. The improvement recited in claim 1 wherein the portion of reduced width substantially begins at and extends below $H_{px}$ for zero speed.

4. The improvement recited in claim 1 wherein each rotor bar is segmented to obtain reduced width.

5. The improvement recited in claim 1 wherein the segment of reduced width substantially begins at and extends below $H_{px}$ for zero speed.

6. The improvement recited in claim 5 wherein said rotor bar is further shaped to limit motor running losses such that said segment is followed in depth by a segment of increased width.

7. The improvement recited in claim 6 wherein said segment of increased width is at least as wide as the portion of the bar between $H_{pr}$ and $H_{px}$ for zero speed.

8. In an induction motor having a single squirrel cage rotor with rotor bars of sufficient size for effective realization of the change of depth of penetration with respect to resistance ($H_{pr}$) and with respect to inductance ($H_{px}$) as a function of motor speed, the improvement comprising:
said rotor bars being shaped to increase motor torque at a desired speed intermediate zero speed and breakdown torque speed while maintaining low locked rotor current,
wherein each rotor bar has a portion of a segment removed extending from $H_{px}$ for zero speed and $H_{pr}$ for said desired speed, such that the width of the rotor bar between $H_{px}$ for zero speed and $H_{pr}$ for said desired speed is less than the width of the bar between $H_{pr}$ and $H_{px}$ for zero speed.

9. The improvement recited in claim 8 wherein said segment portion removed extends to $H_{px}$ for said desired speed, such that the width of the rotor bar between $H_{px}$ for zero speed and $H_{pr}$ for said desired speed is less than the width of the bar between $H_{pr}$ and $H_{px}$ for zero speed.

10. In an induction motor having a single squirrel cage rotor with rotor bars of sufficient size for effective realization of the change of depth of penetration with respect to resistance ($H_{pr}$) and with respect to inductance ($H_{px}$) as a function of motor speed, the improvement comprising:
said rotor bars being multisegmented and including at least
a segment between $H_{pr}$ and $H_{px}$ for zero speed sufficiently wide to effectively limit locked rotor current,
a second segment between $H_{px}$ for zero speed and $H_{pr}$ for a desired speed, between zero speed and breakdown torque speed of reduced width for increasing motor torque for a range about said desired speed and,
a third segment between $H_{px}$ for said desired speed and the base of the rotor bar of sufficient width to reduce motor running losses.

11. The improvement recited in claim 10 wherein said third segment is at least as wide as the segment between $H_{pr}$ and $H_{px}$ for zero speed.

12. The improvement recited in claim 8 wherein said desired speed is the speed at which motor torque approaches the torque of the load driven by said motor.

References Cited

UNITED STATES PATENTS

| | | | |
|---|---|---|---|
| 2,242,010 | 5/1941 | Macmillan | 310—212 |
| 2,794,138 | 5/1957 | Dunn | 310—211 |
| 3,045,135 | 7/1962 | Honsinger | 310—212 |
| 3,401,280 | 9/1968 | Lackey et al. | 310—211 X |

OTHER REFERENCES

AIEE Technical Paper 51–369, September 1951, "Network Analysis of A-C Machine Conductors," Babb & Williams.

AIEE Technical Paper 54–15, November 1953, "Skin-Effect Bars of Squirrel-Cage Rotors," Liwschitz-Garik.

AIEE Transactions, vol. 72, Part III, August 1953, "Double and Triple Cages for Polyphase Induction Motors," Alger & Wray, pp. 637–645.

WARREN E. RAY, Primary Examiner